May 8, 1951

W. J. POCH 2,552,060

TELEVISION CIRCUITS

Filed July 26, 1945

INVENTOR.
Waldemar J. Poch
BY
H. S. Grover.
ATTORNEY

Patented May 8, 1951

2,552,060

UNITED STATES PATENT OFFICE 2,552,060

TELEVISION CIRCUITS

Waldemar J. Poch, Moorestown, N. J., assignor to Radio Corporation of America, a corporation of Delaware Application July 26, 1945, Serial No. 607,109

5 Claims. (Cl. 250—36)

Figures 1, 2:
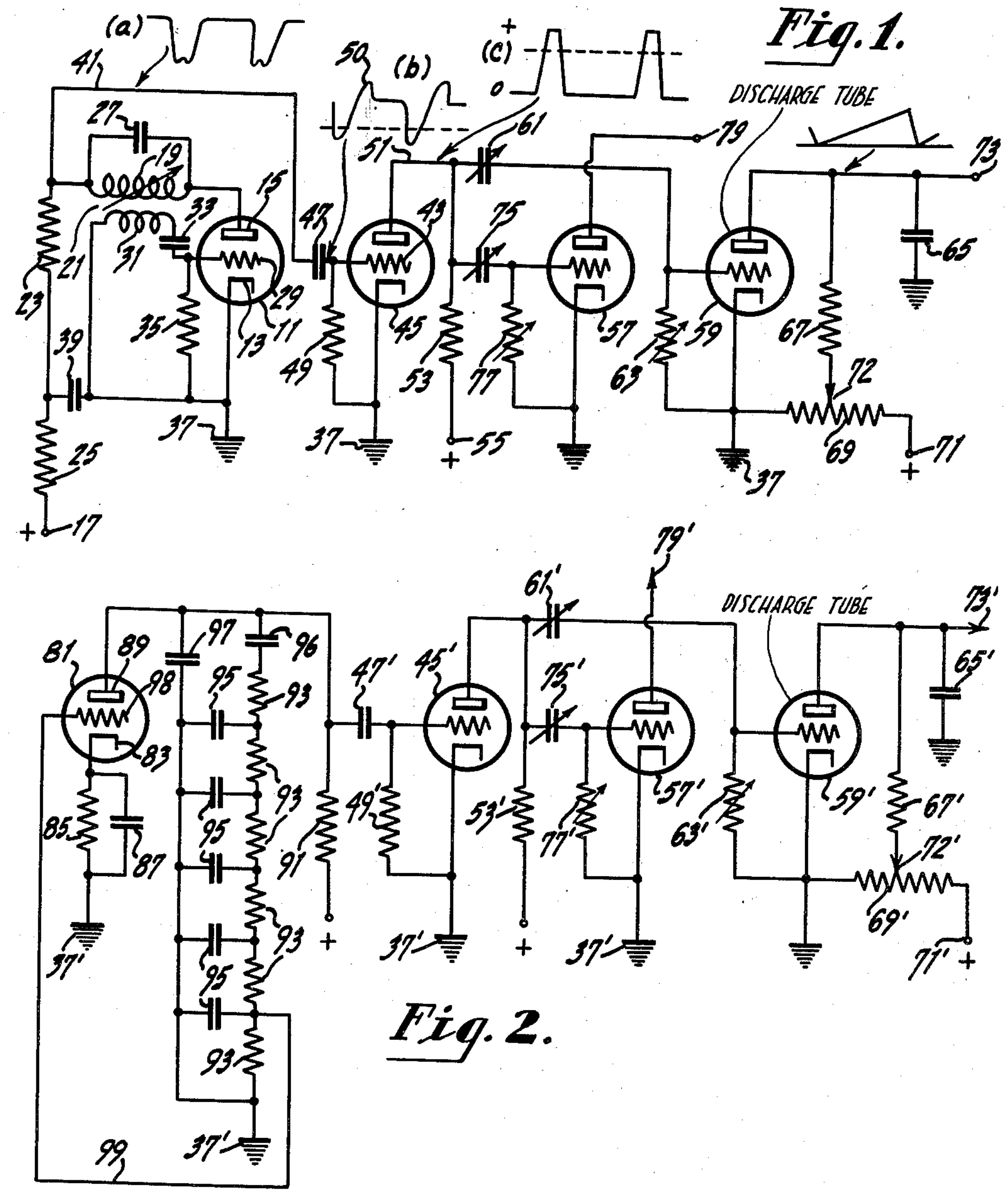

This invention is related to television circuits of the type wherein a stabilized local oscillator is utilized to develop the signal energy from which suitable output signal pulses will be derived to provide blanking, synthesizing or other forms of controlling signals utilized in connection with television, oscillographic or other related forms of apparatus.

In the broadest sense, the invention incorporates a suitable stabilized oscillator of any desired character, for example, a relaxation oscillator of the blocking variety, a resistance-capacity oscillator, a multivibrator or the like, for providing signals at a desired output frequency which may be utilized to control certain scanning circuits. In combination with this oscillator, suitable pulse wave shapers are utilized for deriving pulse energy of suitable character from the approximately sine wave formation energy normally developed by the oscillator. The output energy of pulse form is thus suitable for controlling the deflection of a cathode ray beam which is developed within a tube and causing it to scan the target electrode of a television camera tube or to scan the target electrode of suitable monitor image producing tube or the target electrode of a suitable wave tracing oscillographic monitoring device, to state but a few of the numerous applications of the invention.

It, therefore, becomes an object of this invention to provide an improved form of arrangement from which stabilized signal controlling pulses may be developed. It is also among the objects of this invention to provide simplified control pulse developing circuits which overcome well known and inherent defects in systems heretofore used, while, at the same time, providing increased fidelity of operation, cheaper installation costs and greater ease of control.

Many other objects of the invention will, of course, suggest themselves from the following specification when considered in conjunction with the accompanying drawings, wherein:

Fig. 1 shows a circuit particularly useful for developing horizontal or line control signals; and wherein Fig. 2 represents a modification of the circuit of Fig. 1 which finds particular usefulness in connection with the development of the so-called frame, field or vertical control pulses developed for controlling and synthesizing apparatus of the above-described character.

Referring now to the drawings and first to Fig. 1, there is provided an oscillator tube 11 which has its cathode 13 grounded at 37. The plate or anode 15 is connected to the positive terminal of a suitable source of voltage (not shown) connected at the terminal point 17 with this connection being made through one winding 19 of a feed-back transformer 21 and the serially connected resistor elements 23 and 25. The winding 19 of the transformer is preferably shunted by a tuning condenser 27. The feed-back between the winding 19 of the transformer 21 and the grid or control electrode 29 of the oscillator tube 11, is provided through a second winding 31 of the transformer which couples to the grid through the condenser 33. A grid leak resistor 35 connects one side of the condenser and the grid 29 to ground 37 and to the tube cathode 13.

The condenser element 39 connects between the lower end of resistor 23 and ground in known manner. The inclusion of the resistor 23 as a series connected element in the plate circuit of the tube 11 is for the purpose of developing across this element a voltage pulse which appears in the conductor 41 and which may be of the general schematically represented wave form *a* shown adjacent this conductor. This is because of the fact that the plate current output from the oscillator tube 11 is also essentially a pulse, as is known from the general feed-back characteristic of the circuit due to the fact that the grid current flowing in the tube 11 will determine the charge on condenser 33 and the operation cycle may be controlled, particularly by the time constant as measured by the value of the resistor 35 and the condenser 33.

With the pulse wave form *a* appearing in the conductor 41 this voltage may be fed to the control electrode or grid 43 of the amplifier tube 45 so that this voltage pulse becomes effective through the differentiating circuit formed by the capacitor 47 and the grid leak resistor 49, which latter element provides the tube with self-bias. The general wave form produced as a result of the passage of the signal voltage represented at *a* through the differentiating circuit is exemplified for illustrative purposes by the wave form *b* which is applied to the input of the tube 43. The dotted line represents, for instance, the cut-off point of the tube and the wave form is essentially the differential of the wave *a* except that the peak pulse marked as 50 is usually reduced in value due to the fact that grid current tends to flow through the tube.

The output voltage from the tube 45 is conventionally represented by the wave form *c* which appears in the conductor 51 and which has been developed across the resistor 53 which has its upper end connected to supply plate voltage to the tube 45 and its lower end connected to terminal point 55 whereat a source of voltage (not shown) has its positive terminal connected.

The large positive pulse which appears across the resistor 53 is fed to both the blanking amplifier 57 and the discharge tube 59. The voltage which is applied to the discharge tube 59 by way of the condenser 61 and the grid leak resistor 63 serves to discharge the condenser 65 through the discharge tube 59. The condenser is connected to be charged through the resistor 67 and the potentiometer 69 which has one terminal connected to ground 37 and the other terminal connected to the terminal connection 71 whereat a source of voltage (not shown) has its positive terminal connected. The magnitude of the charge built up upon the condenser 65 controls or determines the amplitude of the output voltage and may be varied in known manner by adjusting the tapping point 72 on the potentiometer 69.

When the condenser 65 discharges through the tube 59 as a result of the positive pulses of the wave form *c* being supplied to the tube grid, it will be apparent that between the output terminal point 73 and ground, a substantially sawtooth voltage wave is developed, as indicated adjacent the output terminal point.

The same pulse signals *c* are also fed to the blanking amplifier tube 47, as above explained, by way of the condenser 75 and across the grid leak resistor 77, so that each of tubes 57 and 59 is self-biased. The output from the blanking amplifier 57 is supplied to an output terminal point 79 which connects to the video amplifier arrangement. The output terminal 73 connects to the well known horizontal output tube (not shown).

Where synchronizing pulses are developed, it will be apparent that the synchronizing signal itself may be derived by differentiating the pulses at the horizontal output circuit. The position of this pulse relative to the blanking pulse can be varied readily by changing the time constant of the condenser and resistor combination 61, 63 relative to the time constant of the condenser and resistor combination 75, 77. For instance, if it be assumed that each of the resistors 63 and 77 is of a value of one megohm, the condenser 61 may be of a value of 200 M. M. F. and the condenser 75 may be of a value of 300 M. M. F. Under these conditions, one predetermined relationship in the spacings between the produced sync signal and the blanking signal is established so that the so-called "front porch" has one predetermined relationship. If the size of the condenser 61 is increased relative to condenser 75, it will increase the width of the so-called "front porch" but if the condenser size is decreased relative to the condenser 75 the width of the so-called "front porch" will decrease. The relationship between the sync signal information, the blanking signal and the so-called "front porch" is depicted, for instance, in the publication, "Television Standards and Practice" by D. G. Fink, published by McGraw-Hill Book Company, Inc., New York, 1943, where the relationship is shown at page 234.

Referring now to the modification of Fig. 2, like or equivalent portions of this circuit are referred to by like numerals to those set forth in Fig. 1 except that prime indications have been utilized and the explanation thereof will be limited accordingly. By the circuit of Fig. 2, it will be seen that a so-called R-C type oscillator unit has been provided. In this arrangement the oscillator tube 81 has its cathode 83 connected to ground 37 by way of the cathode resistor 85 and shunting condenser 87. The plate or anode 89 of the tube connects, as indicated, to a load resistor 91. Feed-back between the plate and grid circuit of the tube is provided through the base shifting network comprising the serially connected resistor elements 93 and the shunt connected capacity elements 95 to which filter or phase shifting network connection is made by way of the condensers 96 and 97. The grid or control electrode 98 of the tube connects back to the phase shifting network as indicated by way of the conductor 99. In this way, oscillations are developed, although the plate voltage wave is somewhat distorted so that by means of the differentiating circuit comprising the capacity 47′ and the leak resistor 49′ of the amplifier tube 45′, a vertical pulse of positive polarity is developed across the resistor 53′ as was the case in connection with the pulse wave form *c* shown as developed across the resistor 53 of Fig. 1.

The grid circuits of the blanking amplifier tube 57′ and the discharge tube 59′ of Fig. 2 are similar to those shown in Fig. 1 and the synchronizing pulse which is available at the output terminal 73′ upon differentiating the output wave may be adjusted relative to the blanking pulse available at the output terminal 79′ through a variation in the size of the capacitors 61′ and 75′ relative to each other assuming, for instance, that the grid leak resistors 63′ and 77′ are of like size.

Having now described the invention, what I claim is:

1. In a system for developing television control and synthesizing signal pulses of selected character repeating in desired time relationship, the combination of a substantially stable local oscillator, means including a differentiating circuit for deriving output pulses from the oscillator at a pulse frequency coinciding substantially with the oscillator frequency, a blanking amplifier and a discharge tube having their input circuits connected in parallel, each of said input circuits comprising a substantially non-distorting time delay control circuit including a capacity and a resistance element, and means for varying the time constant of each input circuit by varying corresponding resistance or capacity elements of one circuit with respect to the other circuit for controlling the time period at which the produced pulses become effective upon the said blanking and discharge tubes so as to change the phase of the resulting output current from each of the tubes relative to each other under the control of the same input signal pulse.

2. A system for developing control signal pulses, comprising, in combination, a substantially stable local oscillator, a resistive means and a differentiating circuit for deriving output pulses from the oscillator at its oscillation frequency, an amplifier and clipper tube having its input circuit connected to respond to the said differentiated pulses and to produce at its output circuit pulses of like repetition frequency, a blanking amplifier tube and a discharge tube each having their input circuits connected in parallel with the output of the amplifier and clipper tube, each of said connections comprising a non-distorting time delay circuit including a capacitive and a resistive element, and means for varying one of the capacitive and resistive elements of each circuit with respect to a like element of the other circuit for controlling the time period at which the output pulse from the said amplifier and clipper renders the said blanking and discharge tubes operative so as to change the phase of the resulting output current from each of the tubes relative to each other.

3. A system for developing control signal pulses for television systems comprising, in combination, a substantially stable local oscillator, a combination of a resistive means and a differentiating circuit for deriving output pulses from the oscillator with the pulses repeating at the developed oscillation frequency, an amplifier-clipper tube having its input circuit connected to respond to the said differentiated pulses and to produce at its output circuit pulses of like repetition frequency, a blanking amplifier tube and a discharge tube each having their input circuits connected in parallel with the output of the amplifier and clipper tube, each of said connections comprising a substantially non-distorting time constant circuit including a capacitive and a resistive element, and means for varying the capacitive element of each time constant circuit relative to the other for controlling the time period at which the output pulse from the said amplifier and clipper renders the said blanking and discharge tubes operative so as to change the phase of the resulting output current from each of the tubes relative to each other.

4. A system for developing control signal pulses, comprising, in combination, a substantially stable local oscillator, a resistive means and a differentiating circuit for deriving output pulses from the oscillator, which pulses occur at the oscillation frequency of the oscillator, an amplifier-clipper tube having its input circuit connected to respond to the said produced pulses and for producing at its output circuit inverted pulses of like frequency, a blanking amplifier tube and a discharge tube each having their input circuits connected in parallel with the output of the amplifier and clipper tube, each of said input circuits comprising a non-distorting time delay control circuit, and means for varying the time delay of each circuit relative to the other circuit for controlling the time period at which the output pulse from the said amplifier-clipper tube renders the said blanking and discharge tubes operative so as to change the phase of the resulting output current from each of the tubes relative to each other.

5. In a system for developing control signal pulses of selected character repeating in desired time relationship, the combination of a substantially stable control oscillator, means including a differentiating circuit for deriving output pulses from the oscillator at a pulse frequency coinciding substantially with the oscillator frequency, an amplifier and clipper tube connected in a circuit to respond to the said differentiated pulses and to produce at its output pulses of a like frequency to those to which the tube responds, a blanking amplifier and a discharge tube connected in parallel with the said amplifier and clipper tube output and each connected to the said amplifier and clipper through a time delay control circuit only comprising capacitive and resistive elements, and means provided by a variance of the time constant of said elements of one circuit with respect to corresponding elements of the other circuit for controlling the time period at which the output pulse from the said amplifier and clipper renders the said blanking and discharge tubes operative under the control of the same input signal pulse so as to change the phase of the resulting output current from each of the tubes relative to each other.

WALDEMAR J. POCH.

REFERENCES CITED

The following references are of record in the file of this patent:

UNITED STATES PATENTS

| Number | Name | Date |
|---|---|---|
| 2,132,655 | Smith | Oct. 11, 1938 |
| 2,166,712 | Bedford | July 17, 1939 |
| 2,171,536 | Bingley | Sept. 5, 1939 |
| 2,207,048 | Campbell | July 9, 1940 |
| 2,226,459 | Bingley | Dec. 24, 1940 |
| 2,230,212 | Crosby | Jan. 28, 1941 |
| 2,256,530 | Seeley | Sept. 23, 1941 |
| 2,329,339 | DeBaun | Sept. 14, 1943 |
| 2,424,977 | Grieg | Aug. 5, 1947 |